US009910411B2

(12) United States Patent
Celik et al.

(10) Patent No.: US 9,910,411 B2
(45) Date of Patent: Mar. 6, 2018

(54) METHOD AND DEVICE FOR REAL-TIME DIFFERENTIATION OF ANALOG AND DIGITAL SIGNALS

(75) Inventors: Ozkan Celik, Wheat Ridge, CO (US); Vinay Chawda, Houston, TX (US); Marcia K. O'Malley, Houston, TX (US)

(73) Assignee: William Marsh Rice University, Houston, TX (US)

( * ) Notice: Subject to any disclaimer, the term of this patent is extended or adjusted under 35 U.S.C. 154(b) by 581 days.

(21) Appl. No.: 13/979,603

(22) PCT Filed: Jan. 14, 2011

(86) PCT No.: PCT/US2011/021371
§ 371 (c)(1),
(2), (4) Date: Jul. 12, 2013

(87) PCT Pub. No.: WO2012/096673
PCT Pub. Date: Jul. 19, 2012

(65) Prior Publication Data
US 2013/0297048 A1    Nov. 7, 2013

(51) Int. Cl.
*G05B 13/02* (2006.01)
*G05B 15/02* (2006.01)
*G06F 3/01* (2006.01)
*G06F 3/05* (2006.01)

(52) U.S. Cl.
CPC ........... *G05B 13/02* (2013.01); *G05B 15/02* (2013.01); *G06F 3/011* (2013.01); *G06F 3/016* (2013.01); *G06F 3/05* (2013.01)

(58) Field of Classification Search
USPC .............................................. 700/37, 43, 52
See application file for complete search history.

(56) References Cited

U.S. PATENT DOCUMENTS

| 6,647,312 B2* | 11/2003 | Sasaki .................. G05B 13/042 162/198 |
| 6,798,611 B1* | 9/2004 | Romano .............. G11B 5/5582 318/568.18 |
| 7,009,536 B1 | 3/2006 | Gaus, Jr. |
| 2002/0093439 A1 | 7/2002 | Lundin et al. |

(Continued)

OTHER PUBLICATIONS

Barbot et al., Sliding mode observer for triangular input form Proceedings of the 35th IEEE Conference on Decision and Control, 1996., (vol. 2 ) Dec. 11, 1996-Dec. 13, 1996, pp. 1489-1490.*

(Continued)

*Primary Examiner* — Emilio J Saavedra
(74) *Attorney, Agent, or Firm* — Osha Liang LLP

(57) ABSTRACT

The controller includes a differentiating engine configured to receive an input signal value (ISV), wherein the ISV corresponds to state information for one selected from a group consisting of a controlled process and a user interface. The differentiating engine is further configured to determine an error between the ISV and an estimated input signal (EIS), estimate a frequency of the IS, select a plurality of pre-determined gains using the frequency, wherein at least one plurality of pre-determined gains is a suction control gain, determine a first estimated derivative of the input signal (EDIS) using the plurality of pre-determined gains and the error, and to output the first EDIS.

7 Claims, 10 Drawing Sheets

(56) References Cited

U.S. PATENT DOCUMENTS

| | | | |
|---|---|---|---|
| 2006/0092070 A1 | 5/2006 | Moore | |
| 2007/0138992 A1* | 6/2007 | Prisco | A61B 19/22 318/568.21 |
| 2008/0304609 A1 | 12/2008 | Losic | |

OTHER PUBLICATIONS

Habibi et al., "Sliding mode control of an electrically powered industrial robot" IEE Proceedings, vol. 139, No. 2 Mar. 1992 pp. 207-225.*

Levant, Introduction to High-Order Sliding Modes [Online]. Available at: http://www.tau.ac.il/ levant/hosm2002.pdf, 2003, 51 Pages. (Earliest verifiable date is Dec. 9, 2008: the copy provided with this Office Action was accessed via archive.org at: https://web.archive.org/web/20081209092822/http://www.tau.ac.il/~levant/hosm2002.pdf).*

Daly, "Output Feedback Bilateral Teleoperation with Force Estimation in the Presence of Time Delays" PhD thesis University of Waterloo, Canada, Apr. 2010, 189 pgs.*

Kim et al., "Graphics Displays for Operator Aid in Telemanipulation" 1991 IEEE International Conference on Systems, Man, and Cybernetics, 1991. Decision Aiding for Complex Systems, Conference Proceedings, Oct. 13-16, 1991, pp. 1059-1067.*

International Search Report issued in PCT/US2011/021371 dated Mar. 16, 2012 (2 pages).

Written Opinion of the International Searching Authority issued in PCT/US2011/021371 dated Mar. 16, 2012 (4 pages).

International Search Report and Written Opinion issued in PCT/US2011/021371 dated Mar. 16, 2012 (6 pages).

* cited by examiner

METHOD AND DEVICE FOR REAL-TIME DIFFERENTIATION OF ANALOG AND DIGITAL SIGNALS

STATEMENT REGARDING FEDERALLY SPONSORED RESEARCH OR DEVELOPMENT

The invention was made with government support under Contract Number IIS-0448341 awarded by the National Science Foundation. The invention was made with government support under Contract Number IIS-0812569 awarded by the National Science Foundation. The government has certain rights in the invention.

BACKGROUND

Systems capable of real-time derivative estimation of analog and digital signals are key elements in many types of control systems. Systems capable of real-time derivative estimation are currently used in fields as diverse as medicine, robotics, home appliances, power tools, industrial automation, and consumer electronics. With regard to applications requiring high sampling rates, however, existing systems are prone to noise and systematic error. Other low noise differentiator systems may not be suitable for high precision control systems that require high sampling rates due to the fact that these differentiator systems introduce unacceptable time delays into the control systems.

SUMMARY

In general, in one aspect, the invention relates to a non-transitory computer readable medium including instructions, which when executed by a processor performs a method. The method includes obtaining an input signal value (ISV) from an input signal (IS), wherein the ISV corresponds to state information for one selected from a group consisting of a controlled process and a user interface. The method further includes determining an error between the ISV and an estimated input signal (EIS), obtaining a plurality of pre-determined gains, determining a first estimated derivative of the input signal (EDIS) using the plurality of pre-determined gains and the error, and outputting the first EDIS.

In general, in one aspect, the invention relates to a controller. The controller includes a differentiating engine configured to receive an input signal value (ISV), wherein the ISV corresponds to state information for one selected from a group consisting of a controlled process and a user interface. The differentiating engine is further configured to determine an error between the ISV and an estimated input signal (EIS), estimate a frequency of the IS, select a plurality of pre-determined gains using the frequency, wherein at least one plurality of pre-determined gains is a suction control gain, determine a first estimated derivative of the input signal (EDIS) using the plurality of pre-determined gains and the error, and to output the first EDIS.

Other aspects of the invention will be apparent from the following description and the appended claims.

DETAILED DESCRIPTION

Figure 1A:
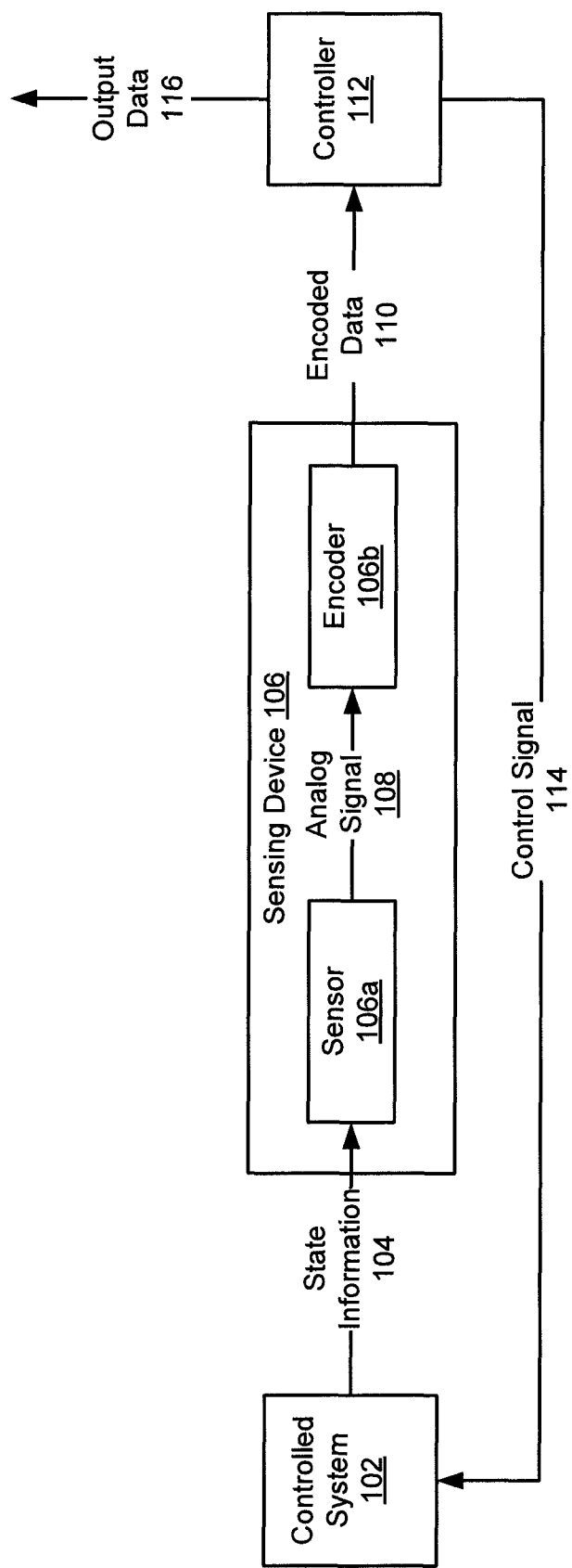
FIGS. 1A-1B show systems in accordance with one or more embodiments of the invention.

Specific embodiments of a method and device for real-time differentiation of analog and digital signals using sliding mode control is described in detail with reference to the accompanying figures. Like elements in the various figures (also referred to as Figs.) are denoted by like reference numerals for consistency.

In the following detailed description of embodiments, numerous specific details are set forth in order to provide a more thorough understanding of the method and device for real-time differentiation of analog and digital signals using sliding mode control. However, it will be apparent to one of ordinary skill in the art that these embodiments may be practiced without these specific details. In other instances, well-known features have not been described in detail to avoid unnecessarily complicating the description.

In general, embodiments of the invention relate to a method and device for real-time differentiation of analog and digital signals using sliding mode control. More specifically, embodiments of the invention relate to a differentiating engine that takes an analog or digital signal as input and outputs the derivative of the analog or digital signal. Further, one embodiment of the differentiating engine may employ a suction control method using a look-up table for optimal differentiator gains. In other embodiments, the differentiating engine may employ an adaptive gain method for differentiation of the signal.

In one or more embodiments of the invention, the differentiating engine may be employed in any system that requires real-time measurement of the derivative of a signal. Examples of such systems may include, but are not limited to, haptic interfaces, teleoperation systems found in medical robotics, undersea robotics and space robotics, image processing, mobile robotics, and unmanned aerial vehicles. Further, in one or more embodiments of the invention, the differentiating engine may be employed in any system that requires fast, accurate, noise-free (or substantially noise-free) calculation and transmission of estimated signal derivatives. For example, the differentiating engine may be employed on a microprocessor or a computer configured to measure velocity, force, and/or acceleration measurements in real time. The microprocessor or computer employing the differentiating engine may use the derivative signal to carry out calculations and manipulations that may be part of a control system requiring high performance and stable operation at high sampling rates.

FIG. 1A shows a system in accordance with one or more embodiments of the invention. In one or more embodiments of the invention, the system includes a controlled system 102, a sensing device 106, and a controller 112. Each of these components is described below.

In one embodiment of the invention, the controlled system 102 may include one or more processes under control for which a rate of change of an input signal (i.e., the derivative of the input signal) is used to monitor and/or control the one or more processes. Examples of processes under control may include, but are not limited to, industrial processes such as those involved in industrial automation (e.g., positioning systems, handling systems, conveyor belts, industrial robotics, etc.), electronics manufacturing (e.g., feeders, surface mount technology (SMT) placement systems, lithography systems, wafer processing systems, etc.), and the various control systems employed in robotic systems (e.g., humanoid robots, medical robots, service robots, educational robots, etc.).

In one embodiment of the invention, the controlled system 102 is configured to generate and output state information 104 that relates to the states of one or more of the processes under control that make up the controlled system 102. Examples of state information, include but are not limited to, position, temperature, pressure, volume, flow rate, or any other measurable state of a controlled system 102 (or process therein).

In one embodiment of the invention, the sensing device 106 is configured to sense state information 104 at sensor 106a thereby creating analog signal 108, and to encode analog signal 108 at encoder 106b. Examples of sensors include, but are not limited to, position sensors, potentiometers, optical sensors, temperature sensors, pressure sensors, flow rate sensors or any other type of sensor configured to sense the state information 104. In one embodiment of the invention, encoder 106b is configured to receive the analog signal 108 and encode (or otherwise format or convert) the analog signal 108 into a digital signal (i.e., the encoded data 110). In one embodiment of the invention, the digital signal conforms to a digital communication protocol. In one embodiment of the invention, the sensing device 106 is an optical encoder. In one embodiment of the invention, the encoded data 110 includes two square-wave pulse trains, where the first pulse train is 90 degrees out of phase with the second pulse train.

In one embodiment of the invention, the controller 112 is configured to receive encoded data 110 and process encoded data 110, thereby creating control signal 114. In one embodiment of the invention, the controller 112 is configured to process the encoded data 110 in accordance with FIGS. 3-5 described below. Additional detail about the controller may be found in FIG. 2A below. In one embodiment of the invention, the controller 112 is further configured to output control signal 114, which may be used by control system 102 to modify the state, and, thus, control one or more of the processes under control. In addition, controller 112 is further configured to output the output data 116 including, for example, information regarding the state of the controlled system 102. Furthermore, output data 116 may be sent to a display, thereby enabling a user to monitor and/or interact with the controlled system 102.

In one embodiment of the invention, the controller 112 is implemented as a microcontroller that includes software to process the encoded data 110. In another embodiment of the invention, the controller 112 is implemented as digital signal processor (DSP) that includes integrated circuits configured to process the encoded data 110. In another embodiment of the invention, the controller 112 is implemented as a field programmable gate array (FPGA) chip or an application-specific integrated circuit (ASIC) that includes integrated circuits configured to process the encoded data 110. In another embodiment of the invention, the controller 112 is implemented as a software application executing on a computer that includes a processor and memory.

In one embodiment of the invention, the controller 112 and the sensing device 106 may be integrated into a single device. In another embodiment of the invention, the controller 112, the sensing device 106, and the controlled system 102 may be integrated into a single device. In another embodiment of the invention, the sensing device 106, and the controlled system 102 may be integrated into a single device. In another embodiment of the invention, the controller 112, the sensing device 106, and the controlled system 102 may each be implemented on separate devices, which are operatively connected together.

Figure 1B:
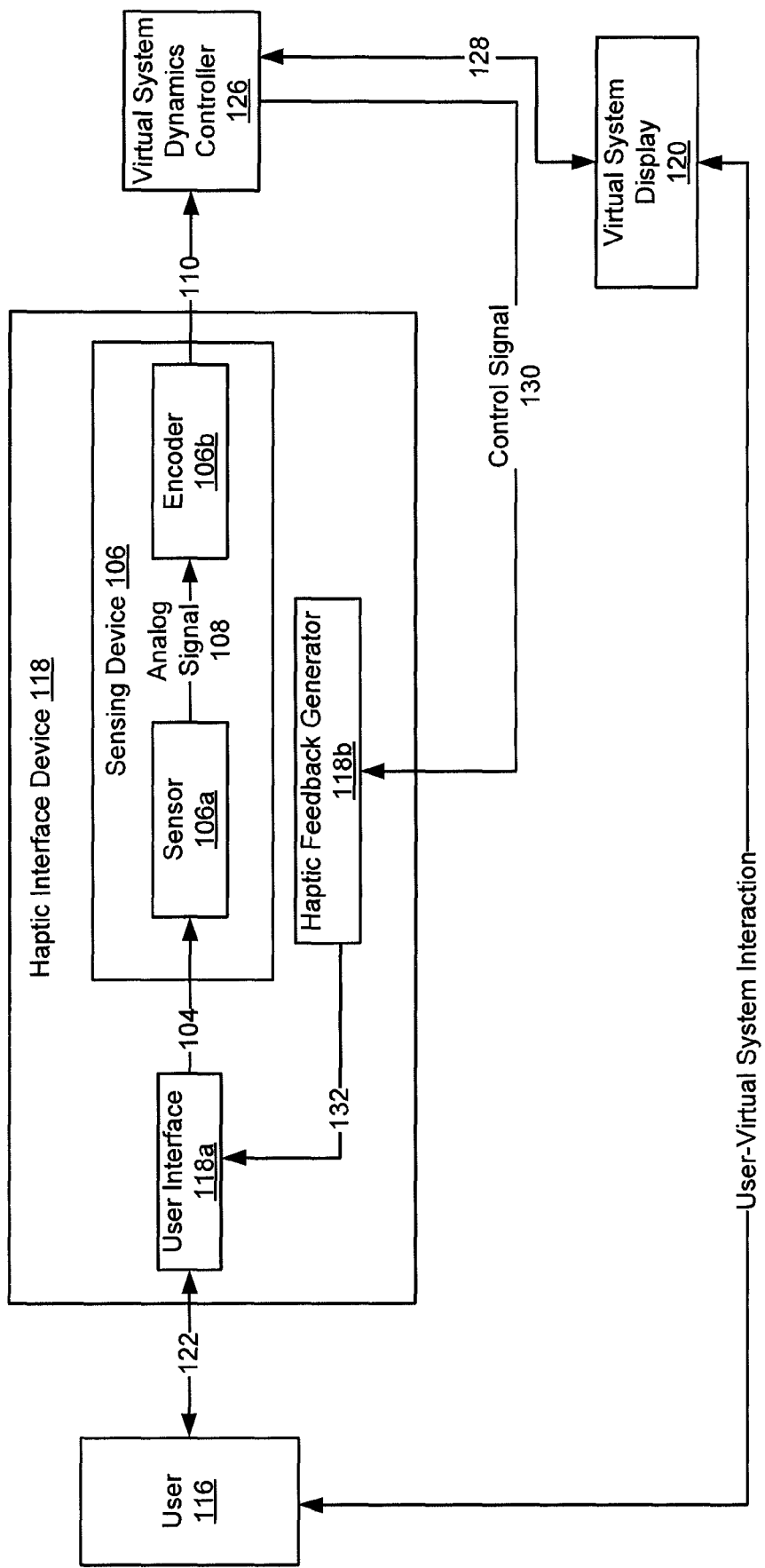

FIG. 1B shows a system in accordance with one or more embodiments of the invention. In one or more embodiments of the invention, the system includes a haptic interface device 118, a virtual system dynamics controller 126, and virtual system display 120. Each of these components is described below.

In one embodiment of the invention, the haptic interface device 118 includes a user interface 118a, a sensing device 106, and a haptic feedback generator 118b. In one embodiment of the invention, the haptic interface device 118 is any device that interfaces with a user through the sense of touch. One of ordinary skill will understand that many different types of haptic interface devices may be employed without departing from the scope of the invention. Examples of haptic interface devices include, but are not limited to, joysticks, styluses, or gloves with sensing and feedback mechanisms. In one embodiment of the invention, the haptic interface devices may be used, for example, in surgery, in teleoperation systems, in assembly systems, in simulators (e.g., flight, virtual environments, training simulators, etc.), etc.

The user 116 may interact with haptic interface device 118 and virtual system display 120. In one embodiment of the invention, haptic interface device 118 is configured to receive user input 122 at user interface 118a. Those skilled in the art will appreciate that the type of user interface and the type of input received may vary based on the type of haptic interface device. For example, if the haptic device is a joystick, then the user interface 118a is the movable portion of the joystick the user holds and moves and the input is the force applied by the user to the aforementioned moveable portion of the joystick.

In one embodiment of the invention, the sensing device 106 (as described above) is configured to sense state information 104 at sensor 106a thereby creating analog signal 108, and to encode analog signal 108 at encoder 106b. Sensing device 106 is further configured to output encoded data 110.

In one embodiment of the invention, the haptic feedback generator 118b is configured to receive output control signal 130 (described below). The haptic feedback generator 118b may be further configured to convert control signal 130 to a haptic feedback signal 132 that may be felt (or otherwise sensed) by the user via the user interface 118a.

In one embodiment of the invention, the virtual system dynamics controller 126 is configured to model a virtual system. Additional detail about the virtual system dynamics controller may be found in FIG. 2B below. For example, if the virtual system is a virtual room that includes various objects, e.g., walls and furniture, then the virtual system dynamics controller 126 is configured to model the interaction of the user with the objects in the virtual room, e.g., the user cannot walk through a wall.

In another example, the virtual system corresponds to a physical human body that a surgeon is operating on using a robotic surgical device. In this scenario, the surgeon is using a haptic device, such as a joy-stick, to manipulate the robotic surgical device and is receiving, from the haptic interface device, force cues relating to the interaction between the robotic surgical device and the physical human body (or portion thereof). In this example, the virtual system dynamics controller 126 generates the control signal 130, which in turn is interpreted by the haptic feedback generator 118b to generate the force cues.

In one embodiment of the invention, the virtual system dynamics controller 126 is further configured to output data 128 to a virtual system display 120, thereby allowing the user to view any change in the virtual system caused by user input 122.

In one embodiment of the invention, virtual system display 120 is configured to display a virtual system that user 116 may interact with through input 122 sent from user 116 to haptic interface device 118. Thus, user 116 may interact with the virtual system through visual inspection of virtual system display 120 and/or interaction with haptic interface device 118.

Figure 2A:
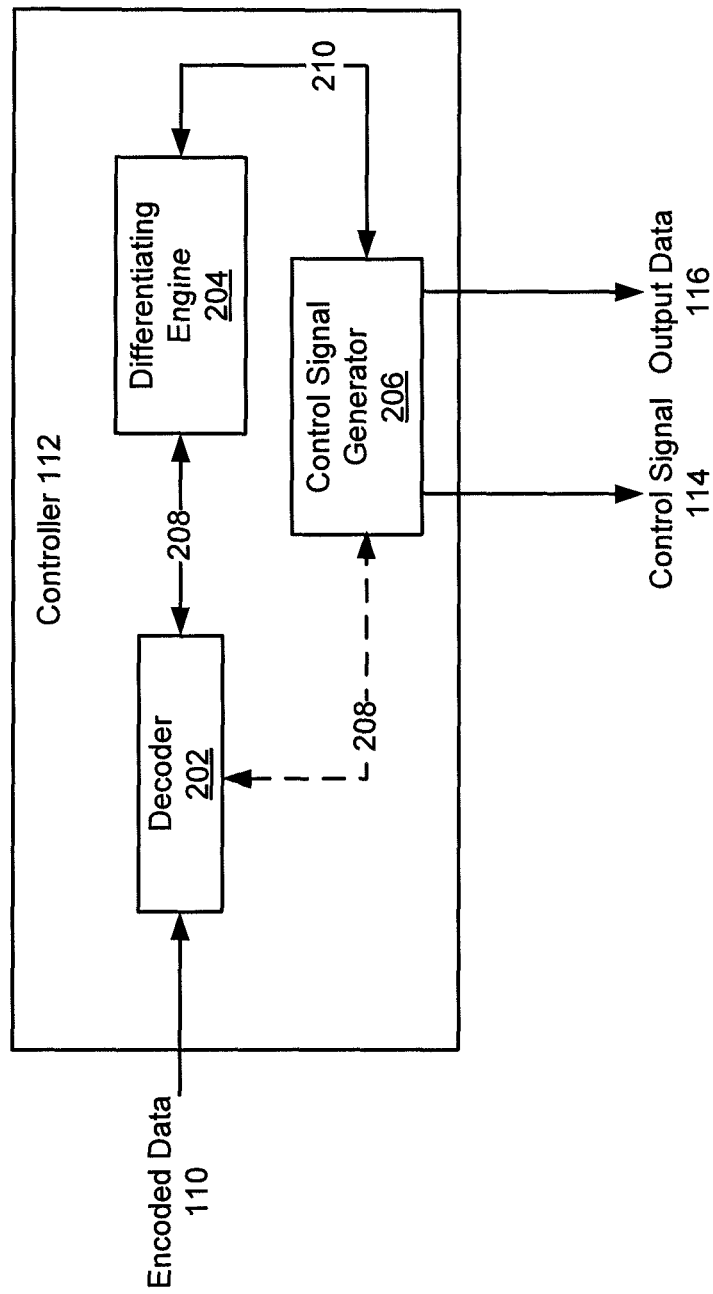
FIGS. 2A-2B show systems in accordance with one or more embodiments of the invention.

FIG. 2A shows a controller in accordance with one or more embodiments of the invention. As shown in FIG. 2A, the controller 112 includes a decoder 202, a differentiating engine 204 and a control signal generator 206. In one embodiment of the invention, the decoder 202 is configured to receive and decode encoded data 110 and to output decoded data 208. In one embodiment of the invention, decoding the encoded data includes extracting the state information from the encoded data. Those skilled in the art will appreciate that the manner in which the state information is extracted may vary based on how the state information is encoded.

In one embodiment of the invention, the differentiating engine 204 is configured to receive the decoded data 208 and perform a real-time differentiation of the decoded data 208. Embodiments of the real-time differentiation performed by the differentiating engine 204 are described in FIGS. 3 and 5 below. The differentiating engine 204 is further configured to output the differentiated data 210 (see, e.g., FIG. 3, Step 312 or FIG. 5, Step 508).

In accordance with one or more embodiments of the invention, the differentiated data 210 may be optionally encoded using a digital communication protocol, for example, using an identical protocol to that used by encoder 106*b*. In one embodiment of the invention, the differentiated data 210 may be encoded using an encoding emulator. In one embodiment of the invention, the encoded differentiated data 210 includes two square-wave pulse trains, where the first pulse train is 90 degrees out of phase with the second pulse train. Further, in one or more embodiments, the digital communication protocol may be equivalent to the digital communication protocol used in optical encoders for position measurement. One of ordinary skill will understand that waveforms other than square-waves may be used, for example, triangle waves, sine waves, etc., and that other phase differences between the waveforms may be used without departing from the scope of the present invention.

In one embodiment of the invention, the control signal generator 206 is configured to, optionally, receive the decoded data 208 and the differentiated data 210. In one embodiment of the invention, the differentiated data 210 is the derivative of the decoded data 208. In one embodiment of invention, the control signal generator 206 is configured to process the differentiated data 210 and, optionally, the decoded data 208, to generate and output a control signal 114. In one embodiment of the invention, the control signal corresponds to a signal that is used to control the controlled system 102 (or a process therein). For example, the control signal 114 may correspond to a temperature control signal that initiates the heating or cooling of a liquid in the controlled system 102.

In one embodiment of the invention, the control signal generator 206 may also output the output data 116, which may include the state information and the differentiated data. The output data 116 may be displayed on a physical display such as a liquid crystal display. Alternatively, the output data 116 may be output directly from the differentiating engine 204.

Those skilled in the art will appreciate that the decoder 202, the differentiating engine 204, and the control signal generator 206 may be implemented entirely in software, entirely in hardware using electronic circuitry, or may be implemented using a combination thereof.

Figure 2B:
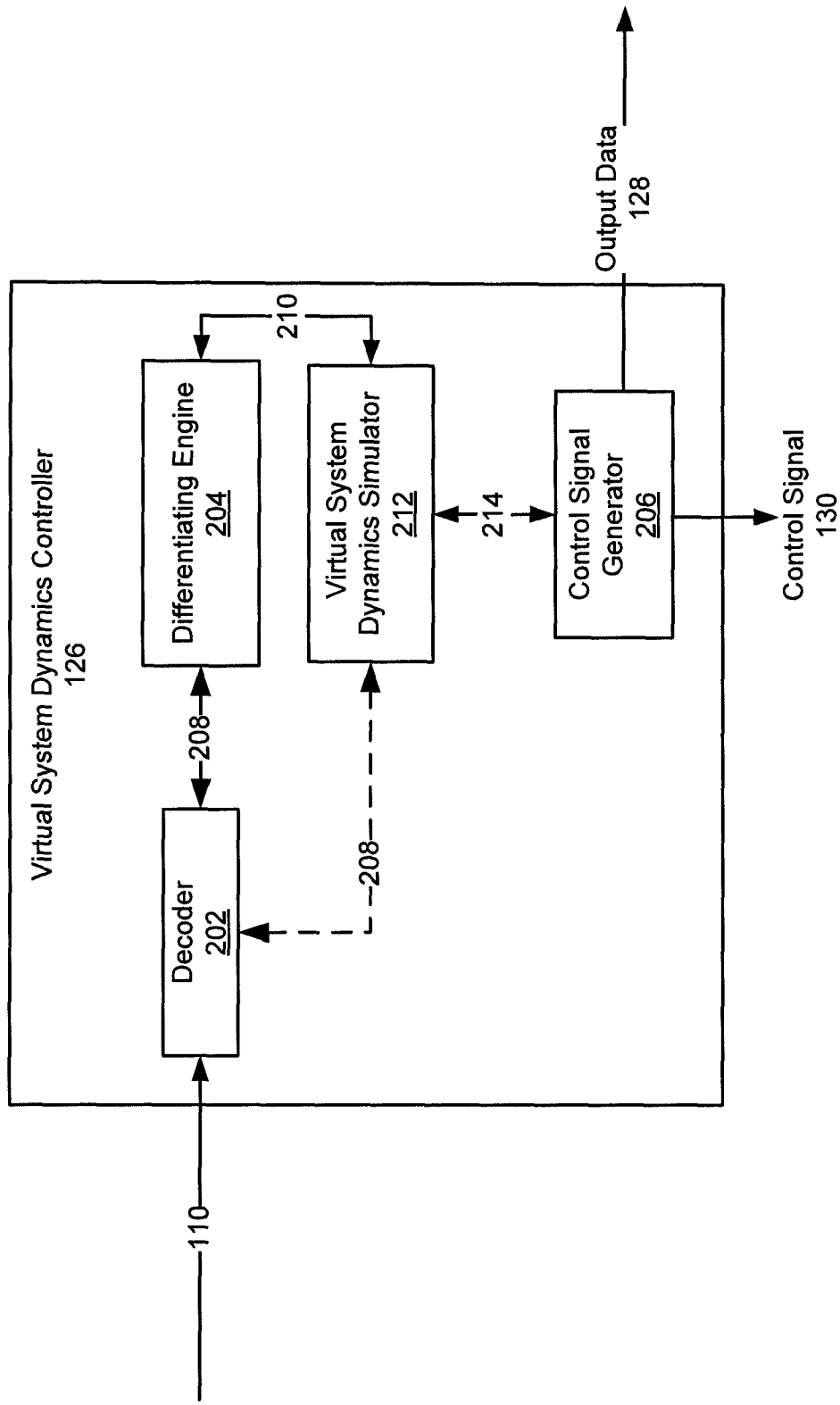

FIG. 2B shows a virtual system dynamics controller in accordance with one or more embodiments of the invention. The virtual system dynamics controller 126 includes a decoder 202, a differentiating engine 204, a virtual system dynamics simulator 212, and a control signal generator 206. The decoder 202, the differentiating engine 204, and the control signal generator 206 shown in FIG. 2B are substantially similar to the corresponding components in FIG. 2A. The virtual system dynamics simulator 212 is configured to, optionally, receive the decoded data 208 and the differentiated data 210 (see, e.g., FIG. 3, Step 312 or FIG. 5, Step 508) and to simulate the dynamics of a virtual system based on the decoded data 208 and the differentiated data 210. In one embodiment of the invention, the virtual system dynamics simulator 212 includes a model of the virtual system, where the model of the virtual system includes a series of mathematical equations that defines the objects in the virtual system, the interaction between objects in the virtual system, and interactions between the user and objects in the virtual system.

The virtual system dynamics simulator 212 is further configured to output the simulation data 214 resulting from the aforementioned simulation of the virtual system. In one embodiment of the invention, the control signal generator 206 is configured to receive the simulation data 214 and process the simulation data 214 thereby creating control signal 130 (described above).

In one embodiment of the invention, the control signal generator 206 may also output the output data 128, which may include the state information, the differentiated data, and the simulation data. The output data 128 may be displayed on a physical display such as a liquid crystal display. Alternatively, the output data 128 may be output directly from the virtual system dynamics simulator 212.

Those skilled in the art will appreciate that the decoder 202, the differentiating engine 204, simulation virtual system dynamics simulator 212, and the control signal generator 206 may be implemented entirely in software, entirely in hardware using electronic circuitry, or may be implemented using a combination thereof.

In accordance with one or more embodiments of the invention, the differentiating engine 204 may output, in real-time (i.e., no time delay or phase lag) or near real-time, an accurate, low noise derivative of decoded data 208. In other words, the differentiation occurs on a point by point basis in real-time.

In accordance with one or more embodiments of the invention, the differentiated data 210 may be optionally encoded using a digital communication protocol, for example, using an identical protocol to that used by encoder 106*b*. In one embodiment of the invention, the differentiated data 210 may be encoded using an encoding emulator. In one embodiment of the invention, the encoded differentiated data 210 includes two square-wave pulse trains, where the first pulse train is 90 degrees out of phase with the second pulse train. Further, in one or more embodiments, the digital communication protocol may be equivalent to the digital communication protocol used in optical encoders for position measurement. One of ordinary skill will understand that waveforms other than square-waves may be used, for example, triangle waves, sine waves, etc., and that other phase differences between the waveforms may be used without departing from the scope of the present invention.

Those skilled in the art will appreciate that while FIGS. 2A-2B only include a single differentiating engine, embodiments of the invention may include multiple differentiating engines. In such cases, the controller 112 and/or the virtual systems dynamics controller 126 may generate the first derivative of the state information as well as higher-order derivatives of the state information.

Figure 3:
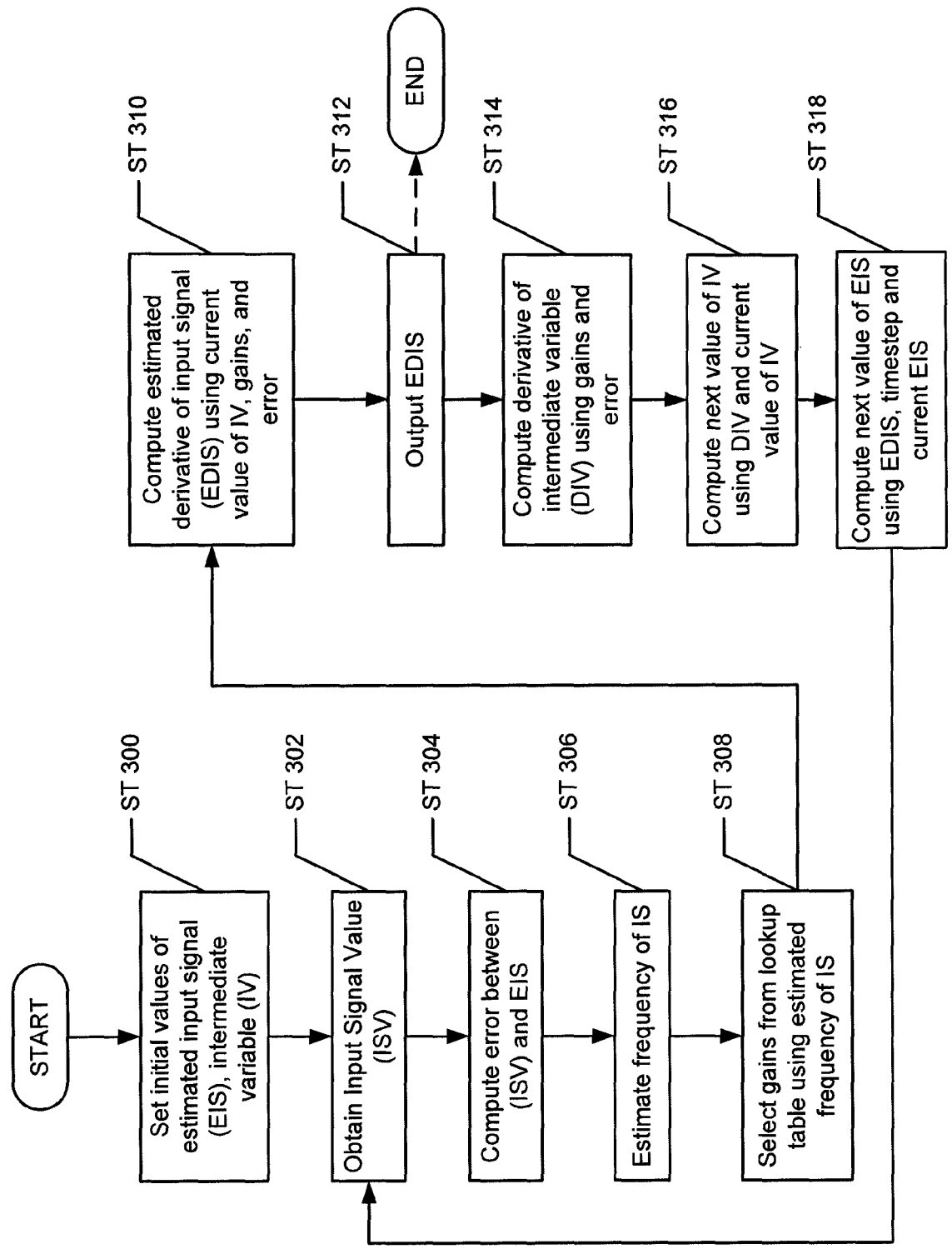
FIGS. 3-5 show flowcharts in accordance with one or more embodiments of the invention.

FIG. 3 shows a flow chart describing a method in accordance with one or more embodiments of the invention. More specifically, FIG. 3 shows a method of operation of a differentiating engine in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

In Step 300, the initial values (i.e., the t=0 values) of the estimated input signal x(t=0) may be set to 0 and the initial value of the intermediate variable v(t=0) may be set to 0. In Step 302, the differentiating engine obtains the initial value of the input signal f(t=0). In Step 304, the error e(t=0) between the initial value of the input signal f(t=0) and the initial value of the estimated input signal x(t=0) is calculated according to equation (1).

$$e(t)=x(t)-f(t) \quad (1)$$

Figure 4:
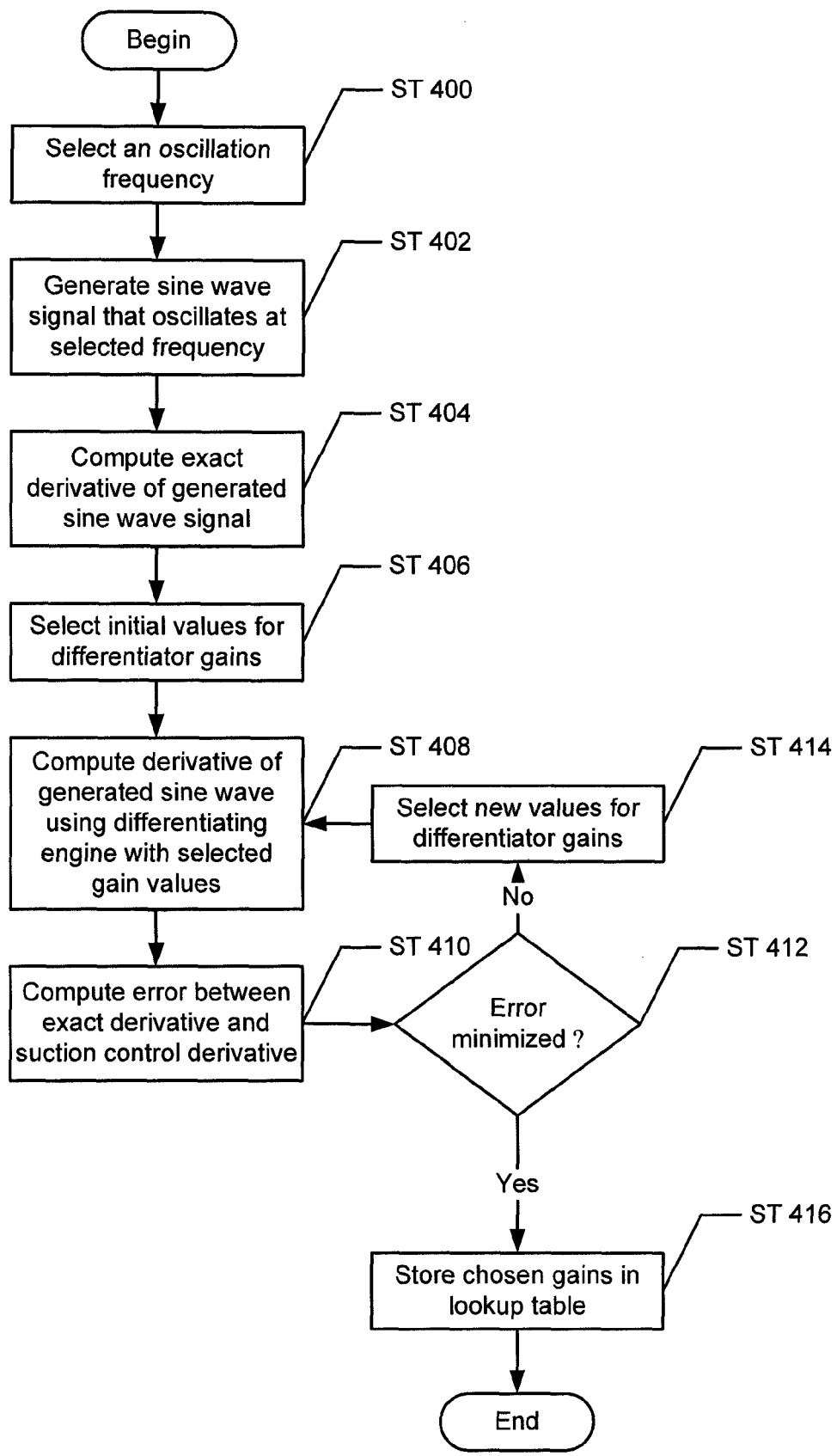

In Step 306, the frequency of the input signal is estimated, for example by performing a discrete Fourier transform on a portion of the input signal that may have been sampled previously. In Step 308, the differentiator gains $\lambda$ and $\alpha$ in addition to the suction control gain k are selected from a lookup table based on the frequency of the input signal f(t). An embodiment for generating the gains in the lookup table is shown in FIG. 4 below. Returning to FIG. 3, in Step 310, the estimated value of the derivative of the input signal u(t=0) is computed based on e(t=0), v(t=0), and the selected gains according to the equation (2).

$$u(t)=v(t)-\lambda|e(t)|^{1/2}\mathrm{sat}(ke(t)) \quad (2)$$

where the saturation function sat(kx) is defined to be $$\mathrm{sat}(kx)=1 \text{ for } x>1/k \quad (3)$$

$$\mathrm{sat}(kx)=kx \text{ for } -1/k<x<1/k \quad (4)$$

$$\mathrm{sat}(kx)=-1 \text{ for } x<-1/k \quad (5)$$

Those skilled in the art will appreciate that equation (2) may be implemented with functions other than the saturation function. Examples of such functions may include sigmoid functions, polynomial functions, trigonometric functions, splines, etc.

In one embodiment of the invention, in Step 312, the estimated value of the derivative u(t=0) is output. In Step 314, the derivative of the intermediate variable v'(t=0) is computed using the chosen gains a and k and the error e(t=0) according to the equation (6):

$$v'(t)=\alpha\mathrm{sat}(ke(t)) \quad (6)$$

In Step 316, the next value of the intermediate variable v(T) is computed according to Euler's method using the derivative of the intermediate variable v'(t=0), the current value of the intermediate variable v(t=0), and the timestep T according to the equation (7).

$$v(t+T)=v'(t)T+v(t) \quad (7)$$

The next value of the intermediate variable v(t=T) may then be used to compute the next value of the estimated derivative of the input signal u(t=T) as described below. In Step 318 the next value of the estimated input signal x(t=7) is computed according to Euler's method using the estimated value of the derivative of the input signal u(t=0), the current estimated value of the input signal x(t=0), and the timestep T according to the equation (8).

$$x(t+T)=u(t)T+x(t) \quad (8)$$

The next value of the estimated input signal x(t=T) may then be used to compute the next value of the estimated derivative of the input signal u(t=T) as described below. One of ordinary skill will appreciate that the calculation of the intermediate variable and the estimated input signal using their respective derivatives is not limited to Euler's method. One or more embodiments of the invention may employ other integration methods, e.g., the trapezoidal integration rule, Simpson's integration rule, etc.

To obtain the next value for the estimated derivative u(t) of the input signal f(t), differentiating engine then performs Steps 302-312, using as input a new sampled value of the input signal f(t=T) in combination with the previously computed values of x(t=T) and v(t=T) from the previous iteration. For example, using the next sampled point of the input signal f(t=T), and the values already obtained for x(t=T) and v(t=T), as described above, the next value of the derivative of the input signal u(t=T) may be obtained. Similarly, the next iteration uses f(t=2T), x(t=2T) and v(t=2T) to obtain u(t=2T). Thus, one iteration accomplished by differentiating engine results in the sampling of one point of the input signal f(t) and the computation and output of one value of the estimated derivative u(t) every T seconds.

FIG. 4 shows a flow chart describing a method in accordance with one or more embodiments of the invention. More specifically, FIG. 4 shows a method for computing a lookup table populated by values of optimized gains $\lambda$, $\alpha$, and k determined for signals having a fixed frequency f. While the various steps in the flowchart are presented and described sequentially, one of ordinary skill will appreciate that some or all of the steps may be executed in different orders, may be combined, or omitted, and some or all of the steps may be executed in parallel.

The lookup table may be used to select the optimal gains for estimation of the time derivative of an input signal using a differentiating engine employing, for example, a suction control method. For example, the lookup table may be used in Step 308 shown in FIG. 3. The lookup table is populated in accordance with the following method.

Turning to FIG. 4, in Step 400 an oscillation frequency f is selected. In Step 402, a sine wave signal f(t) is generated that oscillates at the selected frequency according to the equation (9).

$$f(t)=\sin(\omega t) \quad (9)$$

where $\omega=2\pi f$. In Step 404, the exact derivative (i.e., $\omega\cos(\omega t)$) is computed for f(t).

In Step 406, initial values for gains $\lambda$, $\alpha$, and k are selected. In Step 408, an estimate of the derivative of the generated sine wave is computed using the differentiating engine and the selected gains. The estimated derivative is computed using the suction control method described, for example, in FIG. 3. In Step 410, the error between the exact derivative and the estimated derivative is determined. The error may be quantified by a single number, for example, by computing the root mean square (RMS) error between the exact derivative of the generated sine wave and the estimated derivative of the generated sine wave. In Step 412, a determination is made about whether the error is minimized. If the error is minimized, the gains are output to the lookup table in Step 416. If the error is not minimized, new gains are selected in Step 414 and Steps 408-414 are repeated until the error has been minimized.

One of ordinary skill will recognize that minimization of the error may be accomplished many different ways. For example, a function $G(\alpha,\lambda,k,\omega)$ that outputs the RMS error between the exact derivative of the generated sine wave and the estimated derivative of the generated sine wave may then be minimized for a fixed $\omega$ with respect to the input parameters $\lambda$, $\alpha$, and k by using, for example, a pattern search optimization algorithm.

Figure 5:
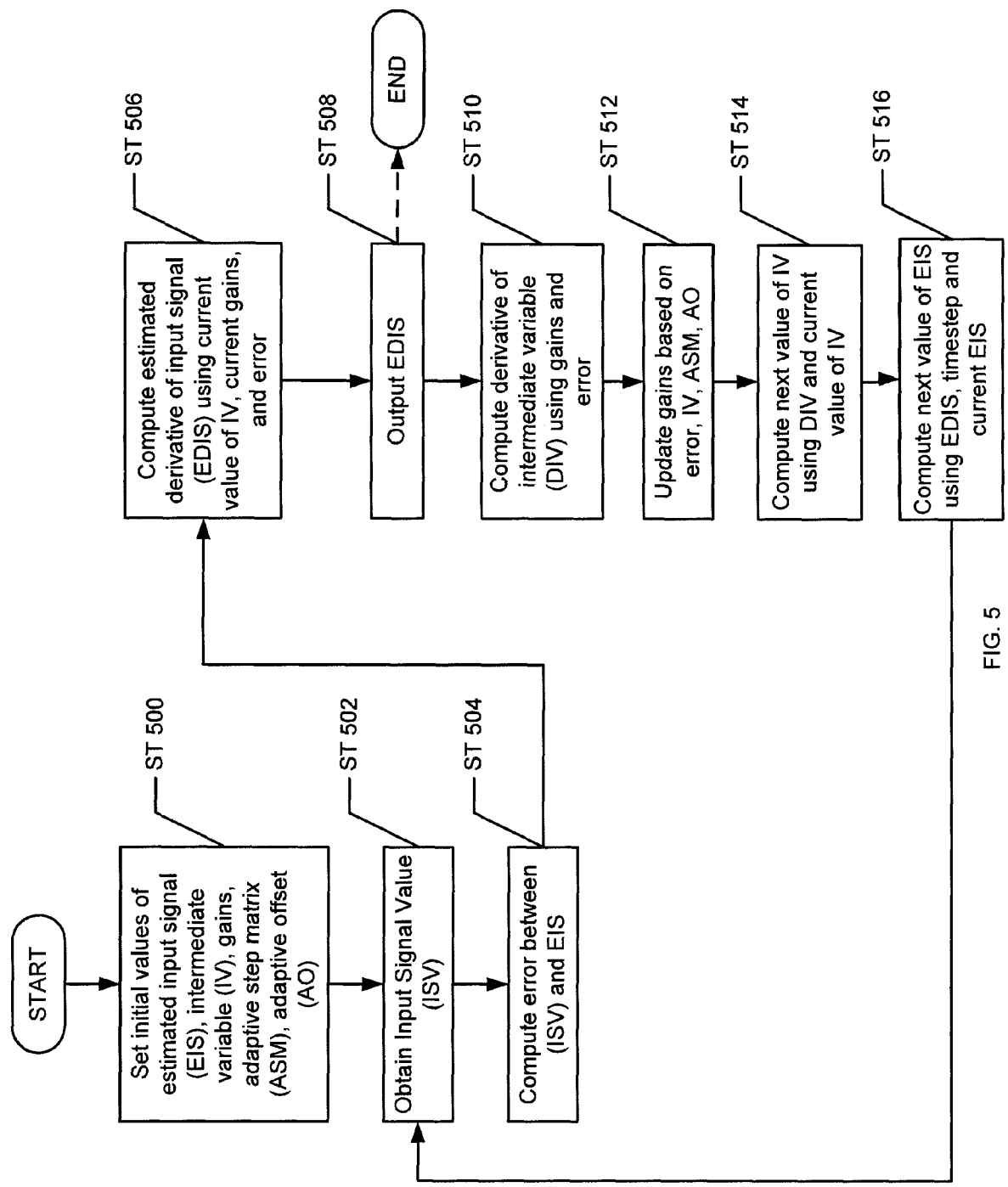

FIG. 5 shows a flow chart describing a method in accordance with one or more embodiments of the invention. More specifically, the differentiating engine uses an adaptive gain control method employing an adaptive update methodology for updating the differentiator gains $\lambda$ and $\alpha$ in accordance with one or more embodiments of the invention. While the various steps in the flowchart are presented and described sequentially, one of ordinary skill will appreciate that some or all of the steps may be executed in different orders, may be combined, or omitted, and some or all of the steps may be executed in parallel.

The adaptive update methodology may be quantified by differential equation (10).

$$\frac{d}{dt}\begin{bmatrix} \alpha(t) \\ \lambda(t) \end{bmatrix} = -\Gamma \begin{bmatrix} v(t) \\ |e(t)|^{1/2}\text{sign}(e(t)) \end{bmatrix}(C-|e(t)|) \quad (10)$$

where the adaptive step matrix $\Gamma$ is a positive definite matrix defined as $$\Gamma = \begin{bmatrix} \Gamma_{\alpha\alpha} & \Gamma_{\alpha\lambda} \\ \Gamma_{\lambda\alpha} & \Gamma_{\lambda\lambda} \end{bmatrix} \quad (11)$$

The elements of $\Gamma$ may be constants, which are selected in advance as is the constant C. The elements of $\Gamma$, thus, relate to the relative effect that $v(t)$ and $|e(t)|^{1/2}$ sign($e(t)$) have on the size of the update step ($d\alpha$ and $d\lambda$) for the differentiator gains $\lambda$ and $\alpha$, respectively. Equation (10) may be rewritten as two equations (12) and (13), for the update steps $d\alpha$ and $d\lambda$ $$d\alpha(t)=-[\Gamma_{\alpha\alpha}v(t)+\Gamma_{\alpha\lambda}|e(t)|^{1/2}\text{sign}(e(t))](C-|e(t)|)T \quad (12)$$

$$d\lambda(t)=-[\Gamma_{\lambda\alpha}v(t)+\Gamma_{\lambda\lambda}|e(t)|^{1/2}\text{sign}(e(t))](C-|e(t)|)T \quad (13)$$

where the time step T has been substituted for dt. The adaptive offset constant C assures that the adaptive update methodology updates the gains properly, even when $e(t)$ is very small. In one embodiment of the invention, C is a non-negative constant. Turning to FIG. 5, at Step 500, the initial values (i.e., the t=0 values) of the estimated input signal x(t=0), the intermediate variable v(t=0), the differentiator gains $\lambda$(t=0) and a(t=0), and the adaptive constants $\Gamma$ and C may be initialized. At Step 502, the differentiating engine obtains the initial value of the input signal f(t=0). At Step 504, the error e(t=0) between the initial value of the input signal f(0) and the initial value of the estimated input signal x(t=0) is calculated according to the equation (14).

$$e(t)=x(t)-f(t) \quad (14)$$

In Step 506, the estimated value of the derivative of the input signal u(t=0) is computed using e(t=0), v(t=0), and the gain $\lambda$ according to the equation (15).

$$u(t)=v(t)-\lambda|e(t)|^{1/2}\text{sign}(e(t)) \quad (15)$$

where the sign function sign(x) is defined as $$\text{sign}(x)=1 \text{ for } x\geq 0 \quad (16)$$

$$\text{sign}(x)=-1 \text{ for } x<0 \quad (17)$$

In Step 508, the estimated value of the derivative u(t=0) is output. In Step 510, the derivative of the intermediate variable v'(t=0) is computed using the gain a and the error e(t=0) according to the equation (18)

$$v'(t)=-\alpha\text{sign}(e(t)) \quad (18)$$

In Step 512, the change in the differentiator gains $d\alpha$ and $d\lambda$ are computed by equation (12) and (13), respectively, using e(t=0), v(t=0), and the time step T and new gains $\lambda$(t=T)=$\lambda$(t=0)+$d\lambda$ and $\alpha$(t=T)=$\alpha$(t=0)+$d\alpha$ are computed.

In Step 514, the next value of the intermediate variable v(t=7) is computed according to Euler's method using the derivative of the intermediate variable v'(t=0), the current value of the intermediate variable v(t=0), and the time step T according to the equation (19)

$$v(t+T)=v'(t)T+v(t) \quad (19)$$

In Step 516, the next value of the estimated input signal x(t=T) is computed according to Euler's method using the estimated value of the derivative of the input signal u(t=0), the current estimated value of the input signal x(t=0), and the time step T according to the equation (20).

$$x(t+T)=u(t)T+x(t) \quad (20)$$

One of ordinary skill will appreciate that the calculation of the intermediate variable and the estimated input signal using their respective derivatives is not limited to Euler's method. One or more embodiments of the invention may employ other integration methods, e.g., the trapezoidal integration rule, Simpson's integration rule, etc.

To obtain the next value for the estimated derivative u(t) of the input signal f(t), differentiating engine then performs Steps 502-508, using as input a new sampled value of the input signal f(t=T) in combination with the previously computed values of x(t=1), v(t=T), $\lambda$(t=T), and $\alpha$(t=T) from the previous iteration. For example, using the next sampled point of the input signal f(t=T), and the values already obtained for x(t=T), v(t=T), $\lambda$(t=T), and $\alpha$(t=T), the next value of the derivative of the input signal u(t=T) may be obtained. Similarly, the next iteration uses f(t=2T), x(t=2T), v(t=2T), $\lambda$(t=2T), and $\alpha$(t=2T) to obtain u(t=2T). Thus, one iteration accomplished by differentiating engine results in the sampling of one point of the input signal f(t) and the computation and output of one value of the estimated derivative u(t) every T seconds.

One of ordinary skill in the art will understand that both the suction control method described in FIG. 3 and the adaptive gain method described in FIG. 5 may be implemented together in one or more embodiments of the invention. For example, the adaptive gain method may be implemented using equation (6) in place of equation (18). In such cases, the suction control gain k may be adaptively updated by employing a third update equation or the suction control gain k may be held constant.

The following figures show examples of using one or more embodiments of the invention. In these figures, the legend uses the term "invention". This term is used to indicate that one embodiment of the invention was used to generate the corresponding data. The legend should not be construed as limiting the scope of the invention in any manner.

Figure 6:
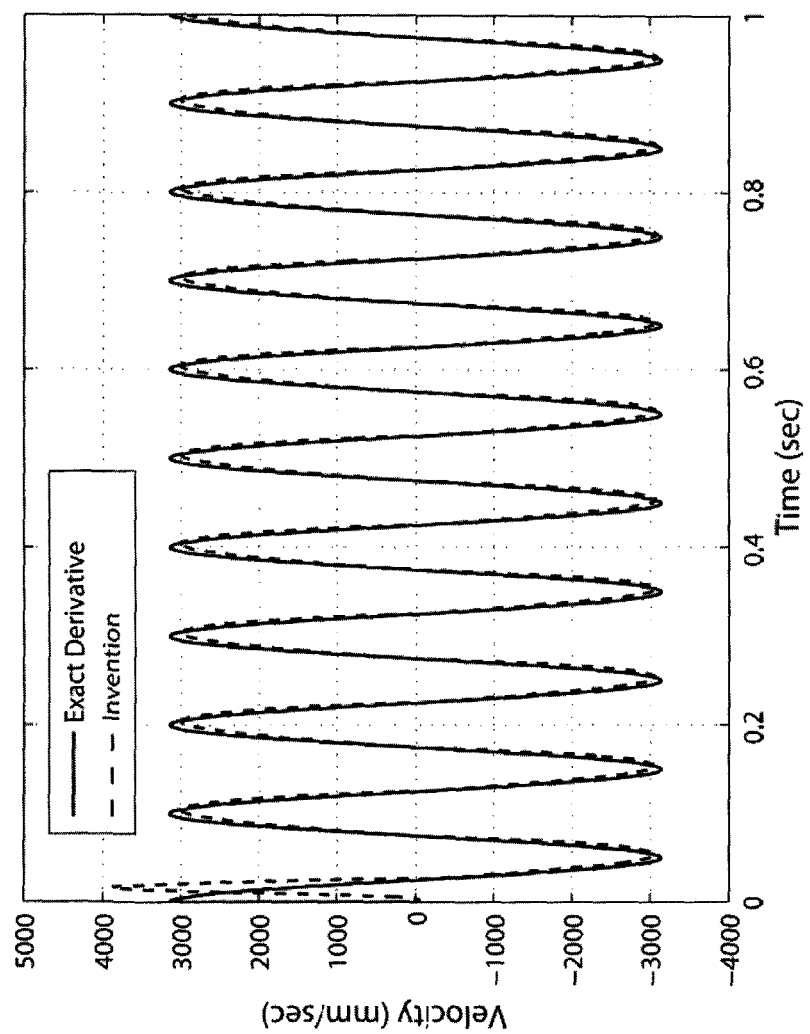
FIGS. 6-8 show examples of a differentiated signal in accordance with one or more embodiments of the invention.

FIG. 6 shows an example of a differentiated signal in accordance with one or more embodiments of the invention. More specifically FIG. 6 shows an example of a differentiated signal output by a differentiating engine employing the method described in FIG. 5. As shown in FIG. 6, the error in the estimated derivative decreases over time. In particular, in this example, the error in the estimated derivative approaches zero after 0.025 s of operation. Further, as shown in FIG. 6, there is minimal time lag between the exact derivative and the estimated derivative and minimal waveform distortion in the estimated derivative. In addition, there is minimal or no chatter (high frequency noise) induced when the error e(t) crosses zero.

Figure 7A:
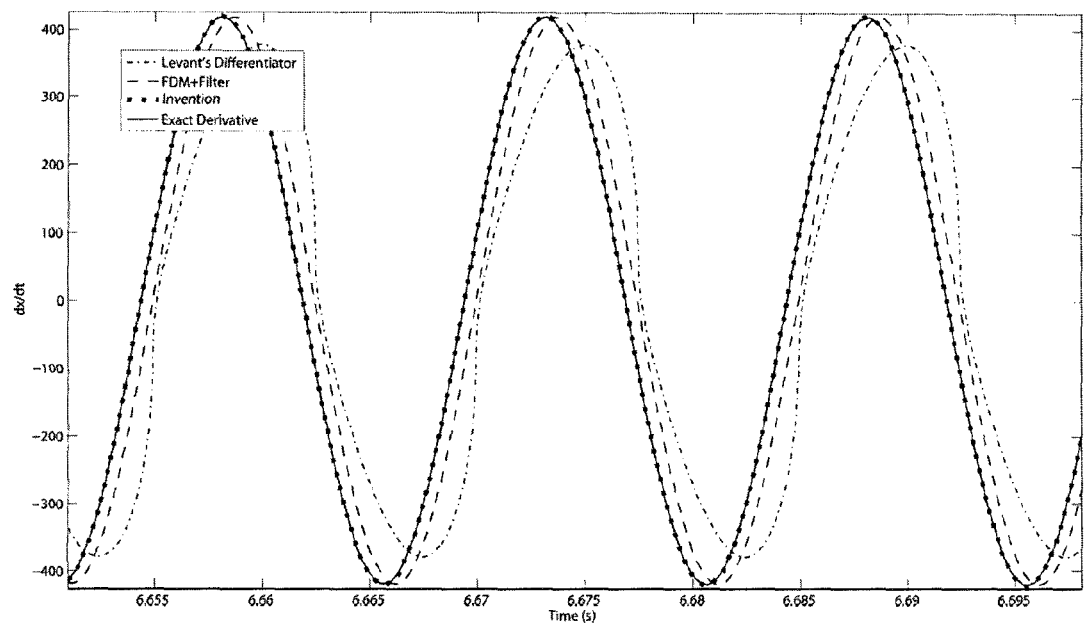
Figure 7B:
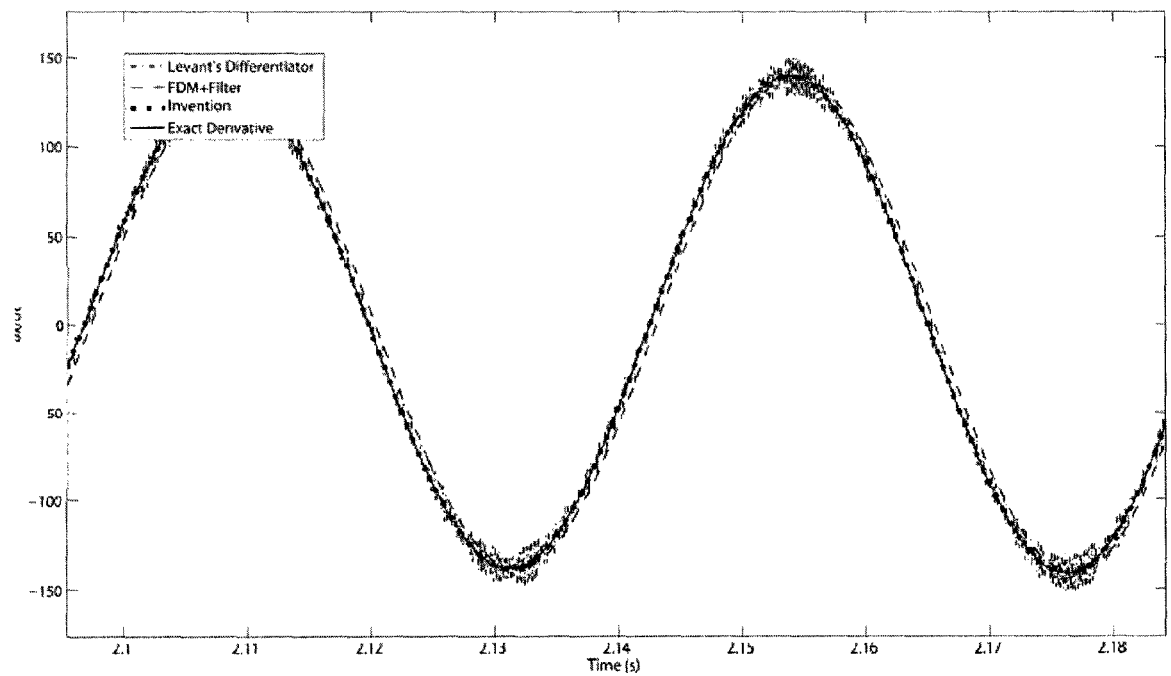

FIGS. 7A-7B show examples of differentiated input signals in accordance with one or more embodiments of the invention. More specifically FIGS. 7A-7B show an example of a differentiated signal output by a differentiating engine employing the method described in FIG. 3. FIG. 7A shows that, for a known function sin(ωt), where w is approximately 67 Hz, there is minimal or no time lag between the exact derivative (ω cos(ωt)) and the estimated derivative and minimal or no chatter (high frequency noise). By contrast, the prior art method employing a fixed gain Levant's differentiator shows significant waveform distortion present in the estimated derivative. In addition, by contrast, the prior art method employing a low pass filtered finite difference method (FDM+Filter) shows significant time lag present in the estimated derivative.

FIG. 7B shows that, for a known function sin(ωt), where ω is approximately 22 Hz, there is minimal or no time lag between the exact derivative (ω.cos(ωt)) and the estimated derivative and minimal or no chatter. By contrast, the prior art method employing a fixed gain Levant's differentiator shows significant chatter present in the estimated derivative. In addition, by contrast, the prior art method employing a low pass filtered finite difference method (FDM+Filter) shows significant time lag present in the estimated derivative.

Figure 8:
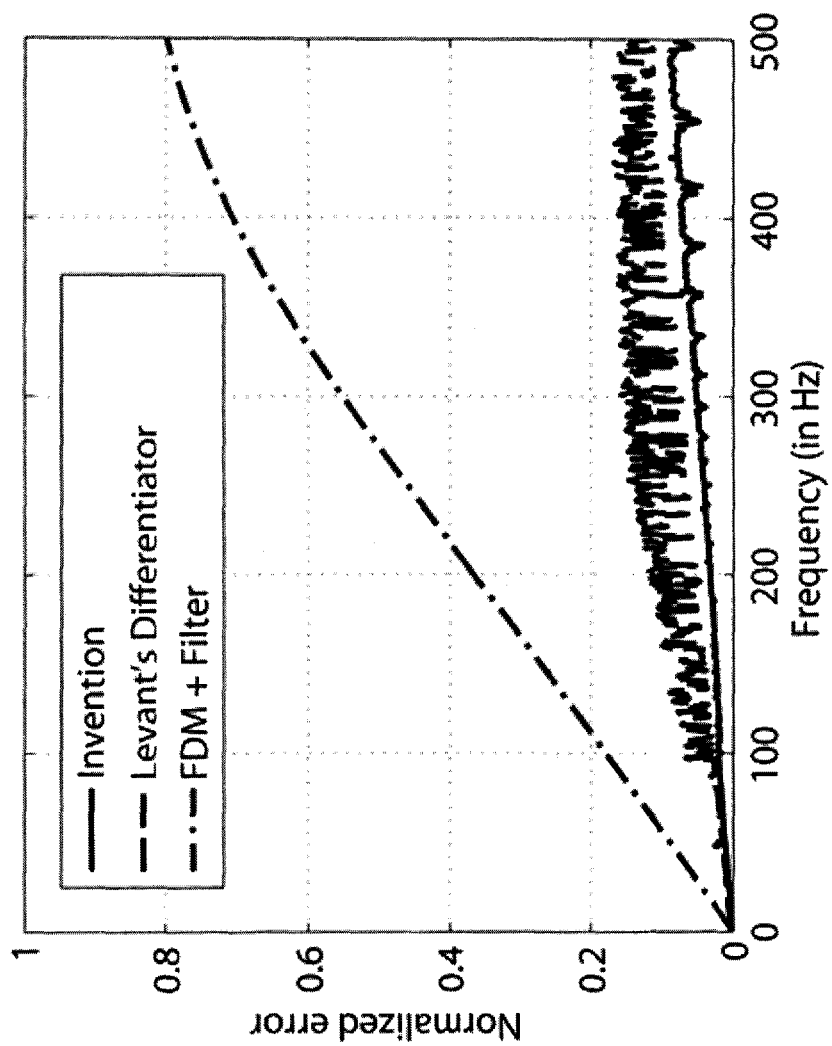

FIG. 8 shows an example in accordance with one or more embodiments of the invention. More specifically FIG. 8 shows an example of the frequency dependence of the normalized error in a differentiated signal output by a differentiating engine employing the method described in FIG. 3. The normalized error was calculated by dividing the difference (RMS error) between estimated and exact derivative by the magnitude of the exact derivative (norm of exact derivative signal). In particular, for a wide range of ω in a known function sin(ωt), the normalized error of the estimated derivative determined using embodiments of the invention remains small compared to prior art methods.

One or more embodiments of the invention provide a real-time output of a time derivative of any signal, having minimal noise (or chatter) and minimal time delay. With accurate, virtually noise free and delay free derivative estimations, the stability of controlled systems according to one or more embodiments of the invention may be enhanced and consequently the system may be operated at higher sampling or loop rates, and/or can be driven to operate faster without risking stability.

One or more embodiments of the invention employ a digital communication protocol at the output of the differentiating engine that allows for the communication of the estimated derivative signal at high sampling rates without the introduction of noise. In one embodiment of the invention, the encoded differentiated data includes two square-wave pulse trains, where the first pulse train is out of phase with the second pulse train. Encoding in this manner allows for seamless integration of the differentiating engine into existing systems that employ, for example, encoder input channels, counters or decoders.

Embodiments of the invention may be implemented on virtually any type of computer regardless of the platform being used. For example, a computer system includes one or more processor(s), associated memory (e.g., random access memory (RAM), cache memory, flash memory, etc.), a storage device (e.g., a hard disk, an optical drive such as a compact disk drive or digital video disk (DVD) drive, a flash memory stick, etc.), and numerous other elements and functionalities typical of today's computers. The computer may also include input means, such as a keyboard, a mouse, or a microphone. Further, the computer may include output means, such as a monitor (e.g., a liquid crystal display (LCD), a plasma display, or cathode ray tube (CRT) monitor). The computer system may be connected to a network (e.g., a local area network (LAN), a wide area network (WAN) such as the Internet, or any other similar type of network) via a network interface connection. Those skilled in the art will appreciate that many different types of computer systems exist, and the aforementioned input and output means may take other forms. Generally speaking, the computer system includes at least the minimal processing, input, and/or output means necessary to practice embodiments of the invention.

Further, software instructions to perform embodiments of the invention may be stored on any non-transitory computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising instructions, which when executed by a processor performs a method, the method comprising:
   obtaining, by a virtual system dynamics controller, an input signal value (ISV) from an input signal (IS), wherein the ISV corresponds to state information for a user interface of a haptic interface device, wherein the haptic interface device is associated with a virtual system;
   determining, by the virtual system dynamics controller, an error between the ISV and an estimated input signal (EIS);
   obtaining, by the virtual system dynamics controller, a plurality of pre-determined gains, wherein the plurality of pre-determined gains are obtained using $$\frac{d}{dt}\begin{bmatrix} \alpha(t) \\ \lambda(t) \end{bmatrix} = -\Gamma \begin{bmatrix} v(t) \\ |e(t)|^{1/2}\text{sign}(e(t)) \end{bmatrix} (C - |e(t)|),$$

where α(t) is a first differentiator gain and λ(t) is a second differentiator gain of the plurality of pre-determined gains, where e(t) is the error between the ISV and the EIS, where Γ is a positive definite matrix, where v(t) is an intermediate variable, and where C is an adaptive offset constant;

wherein the virtual system dynamics controller is further configured to estimate a frequency of the IS, wherein the plurality of pre-determined gains are obtained using the frequency, and wherein the plurality of pre-determined gains are obtained from a lookup table comprising optimal gains for each of a plurality of input signal frequencies;

determining, by the virtual system dynamics controller, a first estimated derivative of the input signal (EDIS) using the plurality of pre-determined gains and the error, comprising: using u(t)=v(t)−λ|e(t)|$^{1/2}$ sat(ke)(t)), wherein λ is a differentiator gain and k is a suction control gain of the plurality of pre-determined gains, where e(t) is the error between the ISV and the EIS, and where v(t) is an intermediate variable;

simulating, by the virtual system dynamics controller, dynamics of the virtual system based at least on the first EDIS to obtain simulation data;

generating, by the virtual system dynamics controller, a control signal using the simulation data, wherein the control signal is used to create a haptic feedback signal used to control a state of the haptic interface device;

outputting, by the virtual system dynamics controller, the control signal to the haptic interface device; and outputting, by the virtual system dynamics controller, at least the simulation data to a virtual system display associated with the virtual system.

2. The non-transitory computer readable medium of claim 1, wherein the method further comprises: determining, by the virtual system dynamics controller, a derivative of an intermediate variable (DIV) using v'(t)=−αsat(ke(t)), wherein α is a differentiator gain and k is a suction control gain of the plurality of pre-determined gains, and where e(t) is the error between the ISV and the EIS;

determining, by the virtual system dynamics controller, a second value of an intermediate variable (IV) using DIV and a first value of the IV;

determining, by the virtual system dynamics controller, a second EIS using the first EDIS and the EIS;

obtaining, by the virtual system dynamics controller, a second ISV from the IS; estimating, by the virtual system dynamics controller, a second frequency of the IS;

selecting, by the virtual system dynamics controller, a second plurality of pre-determined gains using the second frequency; determining, by the virtual system dynamics controller, a second error between the second ISV and second EIS;

determining, by the virtual system dynamics controller, a second EDIS using the second plurality of pre-determined gains and the second error; and outputting, by the virtual system dynamics controller, the second EDIS.

3. A virtual system dynamics controller, comprising:
a differentiating engine configured to:
receive an input signal value (ISV) from an input signal (IS), wherein the ISV corresponds to state information for a user interface of a haptic interface device, wherein the haptic interface device is associated with a virtual system;
determine an error between the ISV and an estimated input signal (EIS);
select a plurality of pre-determined gains, wherein the plurality of pre-determined gains are obtained using $$\frac{d}{dt}\begin{bmatrix}\alpha(t)\\\lambda(t)\end{bmatrix} = -\Gamma\begin{bmatrix}v(t)\\|e(t)|^{1/2}\text{sign}(e(t))\end{bmatrix}(C-|e(t)|),$$

where α(t) is a first differentiator gain and λ(t) is a second differentiator gain of the plurality of pre-determined gains, where e(t) is the error between the ISV and the EIS, where Γ is a positive definite matrix, where v(t) is an intermediate variable, and where C is an adaptive offset constant;

wherein the differentiating engine is further configured to estimate a frequency of the IS, wherein the plurality of pre-determined gains are obtained using the frequency, and wherein the plurality of pre-determined gains are obtained from a lookup table comprising optimal gains for each of a plurality of input signal frequencies;

determine a first estimated derivative of the input signal (EDIS) using the plurality of pre-determined gains and the error, comprising: using u(t)=v(t)−λ|e(t)|$^{1/2}$ sat(ke)(t)), wherein λ, is a differentiator gain and k is a suction control gain of the plurality of pre-determined gains, where e(t) is the error between the ISV and the EIS, and where v(t) is an intermediate variable; and output the first EDIS;

a virtual system dynamics simulator configured to:
receive the first EDIS;
simulate dynamics of the virtual system based at least on the first EDIS to obtain simulation data; and output the simulation data;
and
a control signal generator configured to:
receive the simulation data; generate a control signal using the simulation data, wherein the control signal is used to create a haptic feedback signal used to control a state of the haptic interface device; output the control signal to the haptic interface device;
and
output at least the simulation data to a virtual system display associated with the virtual system.

4. The virtual system dynamics controller of claim 3, wherein the control signal generator is further configured to:
receive the first EDIS, and
generate the control signal using the first EDIS, wherein the control signal is used to control the haptic interface device.

5. The virtual system dynamics controller of claim 3, wherein the differentiating engine is further configured to:
determine a derivative of an intermediate variable (DIV) using v'(t)=−αsat(ke(t)), wherein α is a differentiator gain and k is a suction control gain of the plurality of pre-determined gains, and where e(t) is the error between the ISV and the EIS, determine a second value of an intermediate variable (IV) using DIV and a first value of the IV, determine a second EIS using the first EDIS and the EIS, obtain a second ISV from the IS, estimate a second frequency of the IS, select a second plurality of pre-determined gains from the storage using the second frequency, determine a second error between the second ISV and second EIS, determine a second EDIS using the second plurality of pre-determined gains and the second error, and output the second EDIS.

6. The virtual system dynamics controller of claim 3, wherein the controller is implemented using one selected from a group consisting of a field programmable gate array (FPGA), a microcontroller, a digital signal processor, an application-specific integrated circuit (ASIC), a software executing on a computer.

7. The virtual system dynamics controller of claim 3, wherein the state information is one selected from a group consisting of position, pressure, temperature, flow rate, and volume.

* * * * *